(12) United States Patent
Hutchison et al.

(10) Patent No.: US 7,134,940 B2
(45) Date of Patent: Nov. 14, 2006

(54) DATA STORAGE SPLITTER

(75) Inventors: Roger S. Hutchison, Hopkins, MN (US); Hsi-Ling Lee, Taipei (TW)

(73) Assignee: D3, Inc., Eden Prairie, MN (US)

( * ) Notice: Subject to any disclaimer, the term of this patent is extended or adjusted under 35 U.S.C. 154(b) by 0 days.

(21) Appl. No.: 10/655,888

(22) Filed: Sep. 5, 2003

(65) Prior Publication Data

US 2005/0054271 A1   Mar. 10, 2005

(51) Int. Cl.
 *B24B 1/00* (2006.01)
(52) U.S. Cl. ........................................................ 451/36
(58) Field of Classification Search .................. 451/28, 451/41, 57, 59, 63, 285, 287, 290, 36
See application file for complete search history.

(56) References Cited

U.S. PATENT DOCUMENTS

| | | | | | |
|---|---|---|---|---|---|
| 5,099,618 | A | * | 3/1992 | Schmid | 451/57 |
| 5,537,706 | A | * | 7/1996 | Baker | 15/97.1 |
| 5,571,041 | A | * | 11/1996 | Leikam | 451/37 |
| 5,584,089 | A | * | 12/1996 | Huang | 15/97.1 |
| 5,619,898 | A | * | 4/1997 | Witt | 83/870 |
| 5,954,569 | A | * | 9/1999 | Hutchison et al. | 451/63 |
| 5,964,650 | A | * | 10/1999 | Born et al. | 451/63 |
| 6,039,637 | A | * | 3/2000 | Hutchison et al. | 451/271 |
| 6,243,345 | B1 | * | 6/2001 | Kwang | 369/72 |
| 6,312,320 | B1 | * | 11/2001 | Sato et al. | 451/285 |
| 6,322,430 | B1 | * | 11/2001 | Kennedy et al. | 451/287 |
| 6,334,582 | B1 | | 1/2002 | Castronovo | |
| 6,543,508 | B1 | * | 4/2003 | Koch | 156/391 |
| 6,679,444 | B1 | * | 1/2004 | Castronovo | 241/101.2 |
| 2003/0174616 | A1 | * | 9/2003 | Constantinou et al. | 369/53.21 |
| 2004/0014404 | A1 | * | 1/2004 | Miller | 451/63 |
| 2004/0125722 | A1 | * | 7/2004 | Feehan et al. | 369/53.22 |

FOREIGN PATENT DOCUMENTS

JP           06048082 A  *  2/1994

* cited by examiner

*Primary Examiner*—David B. Thomas
(74) *Attorney, Agent, or Firm*—Wolf, Block, Schorr & Solis-Cohen LLP; William H. Dippert

(57) ABSTRACT

An apparatus is provided for destroying or disabling an information or data storage device comprising a first layer and a second layer bonded together. A mechanical device or energy form is inserted into the information or data storage device to cause the first and second layers to separate from each other.

18 Claims, 3 Drawing Sheets

DATA STORAGE SPLITTER

FIELD OF THE INVENTION

The invention herein relates to a device for splitting information or data storage means. More particularly, the invention relates to a device for destroying or disabling DVD's.

BACKGROUND OF THE INVENTION

One important aspect of our society is the continuing development of technology to store and/or transmit digital information or data. With particular regard to storage technology, it is important that the storage devices or apparatuses be capable of either deleting information stored or of being disabled or destroyed so that information or data cannot be used by others or in unintended ways. For example, for a compact disc read only memory (CD-ROM), there are known devices for destroying the information-bearing layer of a CD-ROM. See, for example, U.S. Pat. Nos. 5,954,569, 6,039,637, and 6,334,582.

A digital vertical disc ("DVD ") is a relatively new optical medium, which holds from about seven (4.7 GB) to twenty-eight (17.1 GB) times the information or data that a CD-ROM can hold. The DVD is a high capacity CD-size disc for video, multimedia, games, and audio applications, usually, but not always, in an 8 or 12 cm diameter format. While a CD-ROM disc has the information layer on the surface of a polycarbonate substrate, the information layer of some types of DVD's is contained inside two layers of polycarbonate, which have been bonded together. There are also two types of erasable DVD discs called DVD-RW, which stands for DVD Re-Write, and DVD RAM which stands for DVD Random Access Memory. All of these DVD media types, except DVD-RW, have the information containing layer inside two pieces of polycarbonate. The objective of this invention is to access the information containing layer of DVD media which has the information content of the media inside two or more protective layers for the purposes of rendering the information content unusable. There is a need for a simple and efficient way to disable the information layer on a DVD, and after the DVD is disabled, to be able to ascertain that the information can no longer be used.

OBJECTS OF THE INVENTION

It is an object of the invention to provide a novel means and method for splitting a device for storing and/or transmitting information or data.

It is also an object of the invention to provide a relatively simple means and method for destroying information or data storage devices such as DVD's.

These and other objects of the invention will become more apparent in the discussion below.

SUMMARY OF THE INVENTION

A representation of a partial cross-section of a typical DVD is set forth in FIG. 1. The primary structural components of a DVD are a first layer 10 and a second layer 12, each of which layer is typically comprised of a polycarbonate in a thickness of about 0.6 mm. Second layer 12 has a reflective layer 14 comprising grooves 16, where information has been laser-etched. An optically transparent bonding layer 20 bonds first layer 10 to second layer 12. Optionally the outer surface 22 of first layer 10 has a label 24.

Grooves on a DVD are often referred to as tracks. Tracks are separated on a DVD by 740 nanometers (0.74 microns) (a nanometer is one billionth of a meter where a micron is one millionth of a meter). This is contrasted to a CD where the tracks are separated by 1600 nanometers (1.6 microns), or roughly 2.16 times larger separation of tracks on a CD compared to the DVD. The minimum length of the pit on a DVD (single-sided) is 400 nanometers (0.4 microns) or roughly 2.08 times smaller than on a CD. If you multiply 2.16 times 2,075, you get the capacity increase of a DVD equal to 4.5 times. This along with a less restrictive error correction redundancy code (in CD-ROM there was a 14 bit-byte instead of the normal 8 bit-byte) leaves the DVD disc containing roughly 7 times the information per layer with up to 4 layers with existing commercial applications. (Thin film technology may alter the capacity of DVDs by adding more layers in the future). The invention here describes first making the DVDs unreadable by separating the polycarbonate layers thereby making the read laser unable to focus on the reflective layer pits, and then adds a secondary physical alteration of the information bearing layer making the pits and tracks altered in such a manner as to be unreadable with existing technology.

According to the invention, an information or data storage device such as a DVD is split or disabled by causing two layers to separate. In one embodiment of the invention, a sharp or cutting element is inserted or forced between the first and second layers to cause the layers to separate. Optionally the information or data storage device is forced against the cutting element while the information or data storage device is rotated, or the cutting element is rotated on the data storage medium.

In another embodiment of the invention, a laser device is focussed on the perimeter of an information or data storage device at the point where the first and second layers come together. Optionally the information or data storage device is rotated so that the laser contacts all or substantially all of the perimeter of the information or data storage device.

In a further embodiment of the invention a heating element is placed or forced between the two polycarbonate layers to cause the layers to separate. Optionally the information or data storage device is rotated so that the heating element contacts all or substantially all of the perimeter of the information or data storage device.

In yet another embodiment, a perforated element is forced under pressure to indent the information layer(s) of the DVD so as to make the information unretrievable.

In yet another embodiment, a fast acting chemical can be used to chemically burn the information layer(s) of the DVD's so as to make the information unretrievable.

It is within the scope of the invention that the devices and procedures described herein can be manual, semi-automatic, or automatic. Moreover, it is within the scope of the invention that devices or procedures can be developed to destroy or disable information or data storage devices on a high volume basis.

DETAILED DESCRIPTION OF THE INVENTION

Figure 1:
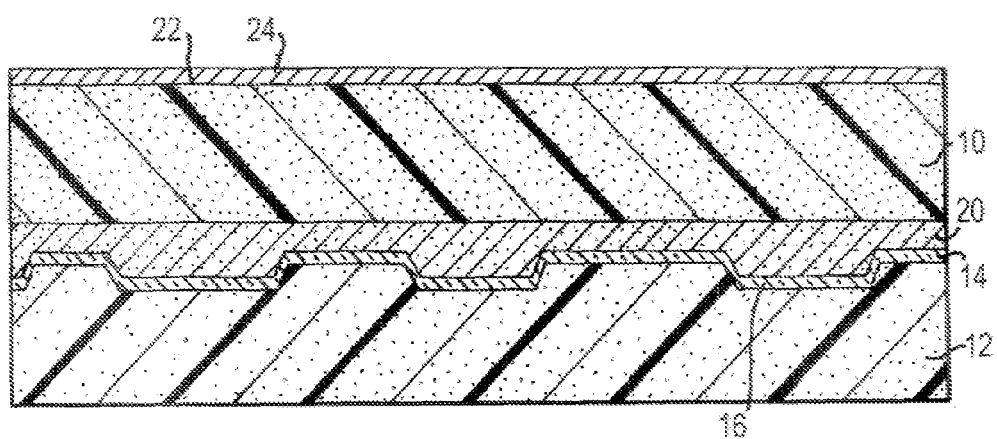
FIG. 1 is a representation of a cross-section of a DVD.
Figure 2:
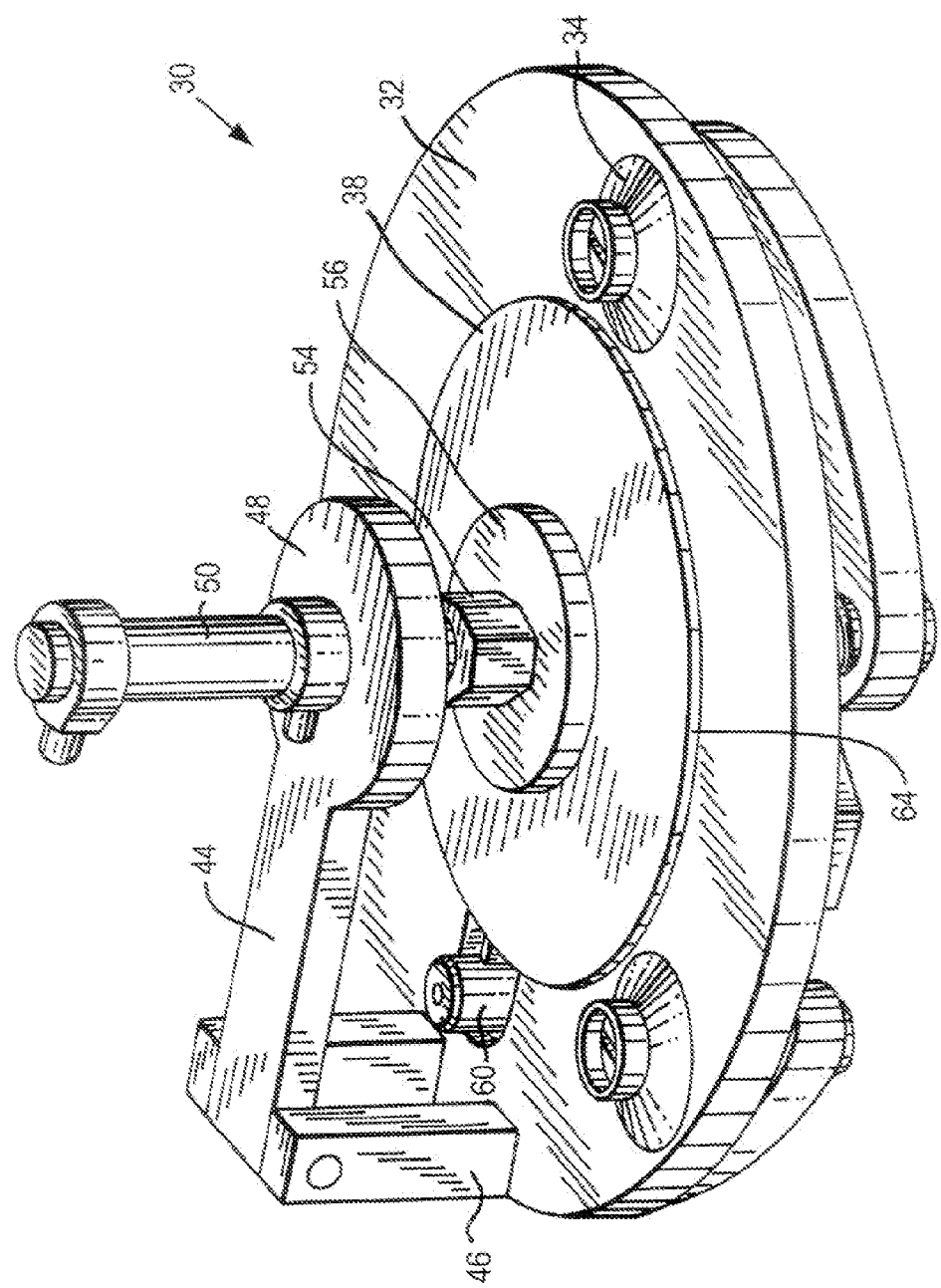
FIG. 2 is a perspective view of one embodiment of the invention.
Figure 3:
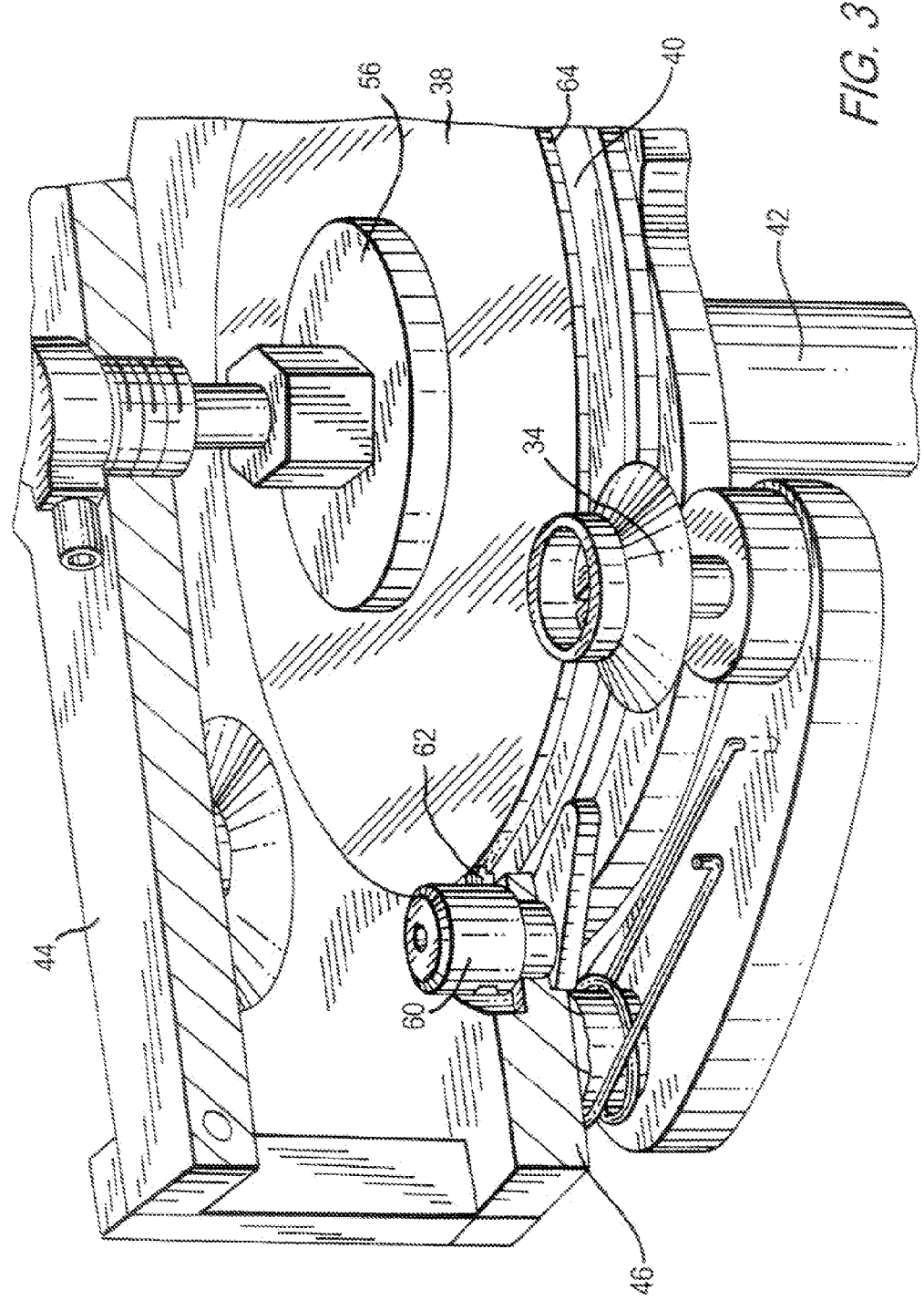
FIG. 3 is a perspective view of a cross-sectional view of the embodiment shown in FIG. 2.

In the embodiment of the invention shown in FIGS. 2 and 3, a disc destroyer 30 comprises a circular support member 32 having rollers 34 extending therethrough. A DVD 38 rests on circular platform 40, which is attached to and rotated by drive shaft 42.

A support arm 44 is attached at one end 46 to circular support member 32. Second end 48 of support arm 44 supports cylindrical member 50. One end 54 of cylindrical member 50 comprises a circular disc 56 that presses DVD 38 against platform 40.

A cutting support member 60 comprises a cutting member 62 that is biased against a peripheral edge 64 of DVD 38. When circular platform 40 rotates, peripheral edge 64 is forced against cutting member 62 to cause layers of the DVD to separate.

While the damage to a Type DVD-5 DVD is shown in FIGS. 2 and 3, the technology described and claimed herein is applicable to other information or data storage devices having layers, including, but not limited to, Type DVD-9, Type DVD-10, or Type DVD-18 DVD's. When there are more than two layers, respective adjacent layers can be separated by simultaneous or sequential application of the procedures discussed above.

While the mere act of cutting or splitting a DVD makes the disc unreadable and/or unusable, further secondary processing of the information layer(s) should be conducted after the splitting process to destroy the DVD's or any information contained thereon. These secondary process steps include physical abrasion of the information layer, heat, chemical or laser scoring of the information layer, as well as physical pressure indentation of the information layer(s). Further, other mechanical or chemical procedures can be used to reduce the split disc members to small particle size pieces, optionally to meet industry or Department of Defense standards.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method for destroying or disabling an information or data storage device comprising a first layer and a second layer bonded together, which comprises the step of focusing laser energy at a point to cause the first and second layers to completely separate from each other.

2. The method of claim 1, wherein the information or storage device is rotated.

3. The method of claim 1, wherein the information or data storage device is a DVD.

4. A method for destroying or disabling an information or data storage device comprising a first layer and a second layer bonded together, which comprises the step of applying thermal energy to the first and second layers to cause the first and second layers to completely separate from each other.

5. The method of claim 4, wherein the information or data storage device is rotated.

6. The method of claim 4, wherein the information or data storage device is a DVD.

7. An apparatus for destroying or disabling an information or data storage device comprising a first layer and a second layer bonded together, wherein the apparatus has means for focusing laser energy into the information or data storage device at a point to cause the first and second layers to completely separate from each other.

8. The apparatus of claim 7, wherein the information or storage device can be rotated.

9. The apparatus of claim 7, wherein the information or data storage device is a DVD.

10. An apparatus for destroying or disabling an information or data storage device comprising a first layer and a second layer bonded together, wherein the apparatus has means for applying thermal energy to the first and second layers to cause the first and second layers to completely separate from each other.

11. The apparatus of claim 10, wherein the information or data storage device can be rotated.

12. The apparatus of claim 10, wherein the information or data storage device is a DVD.

13. A method of destroying or disabling an information or data storage device comprising a first layer and a second layer bonded together, which comprises the steps of:
    (a) applying laser or thermal energy to cause the first and second layers to separate from each other; and
    (b) treating one or both of the first and second layers to render them inoperable of storing or carrying information or data.

14. The method of claim 13, wherein in step (b) the first or second layer is reduced to small particle size pieces.

15. A method for destroying or disabling an information or data storage device comprising a first layer and a second layer bonded together, which comprises focusing laser energy at a point to cause the first and second layers to separate from each other, wherein the information or data storage device is rotated.

16. A method for destroying or disabling an information or data storage device comprising a first layer and a second layer bonded together, which comprises applying thermal energy to the first and second layers to cause the first and second layers to separate from each other, wherein the information or data storage device is rotated.

17. An apparatus for destroying or disabling an information or data storage device comprising a first layer and a second layer bonded together, wherein the apparatus focuses laser energy into the information or data storage device at a point to cause the first and second layers to separate from each other and the information or data storage device is rotated.

18. An apparatus for destroying or disabling an information or data storage device comprising a first layer and a second layer bonded together, wherein the apparatus applies thermal energy to the first and second layers to cause the first and second layers to separate from each other and the information or data storage device is rotated.

* * * * *